United States Patent
Miyazaki

(10) Patent No.: US 8,777,422 B2
(45) Date of Patent: Jul. 15, 2014

(54) ILLUMINATION OPTICAL SYSTEM INCLUDING LIGHT GUIDE ON WHICH BLUE LIGHT IS INCIDENT AT ONE END SURFACE AND GREEN AND RED LIGHT ARE INCIDENT ON A SIDE SURFACE, AND PROJECTOR INCLUDING THE SAME

(75) Inventor: Takeshi Miyazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 235 days.

(21) Appl. No.: 13/166,971

(22) Filed: Jun. 23, 2011

(65) Prior Publication Data

US 2011/0317131 A1    Dec. 29, 2011

(30) Foreign Application Priority Data

Jun. 25, 2010   (JP) ................ P2010-145483

(51) Int. Cl.
*G03B 21/20*   (2006.01)
(52) U.S. Cl.
CPC .................. *G03B 21/204* (2013.01)
USPC ............................ 353/84; 362/84
(58) Field of Classification Search
CPC ................................... G03B 21/204
USPC ........... 353/84, 85, 94, 30, 37, 50, 98; 362/84
See application file for complete search history.

(56) References Cited

U.S. PATENT DOCUMENTS

| | | | |
|---|---|---|---|
| 2008/0079904 A1* | 4/2008 | Bartlett ......................... | 353/31 |
| 2009/0153977 A1* | 6/2009 | Chen et al. .................... | 359/634 |
| 2009/0251789 A1* | 10/2009 | Huibers et al. ................ | 359/634 |
| 2009/0284148 A1 | 11/2009 | Iwanaga | |

FOREIGN PATENT DOCUMENTS

| | | |
|---|---|---|
| CN | 101581410 A | 11/2009 |
| JP | 2003-295319 A | 10/2003 |

OTHER PUBLICATIONS

XJ-A145/XJ-A140—Green Slim Models—Projectors—CASIO, Jan. 6, 2010.*
Casio Releases World's First Mercury-Free High-Brightness Projectors, Jan. 6, 2010.*
Chinese Office Action dated Oct. 24, 2013 (and English translation thereof) in counterpart Chinese Application No. 201110181367.4.

* cited by examiner

*Primary Examiner* — Francis M Legasse, Jr.
*Assistant Examiner* — Bao-Luan Le
(74) *Attorney, Agent, or Firm* — Holtz Holtz Goodman & Chick PC

(57) ABSTRACT

An illumination optical system includes: a light source device including: a red light-emitting device that emits red light; a blue light-emitting device that emits blue light; and a fluorescence plate comprising a green fluorescence region and a light transmission region, wherein the green fluorescence region is excited by the blue light to emit green light, and the light transmission region transmits the blue light; a light guide including a dichroic layer therein, wherein the dichroic layer is arranged to intersect a center axis of the light guide at about 45 degree to transmit the blue light while reflecting the green light and the blue light; a mirror group and a lens group. The blue light transmitted through the light transmission region is incident on an end surface of the light guide, and the red light and the green light are incident on a side surface of the light guide.

8 Claims, 5 Drawing Sheets

ILLUMINATION OPTICAL SYSTEM INCLUDING LIGHT GUIDE ON WHICH BLUE LIGHT IS INCIDENT AT ONE END SURFACE AND GREEN AND RED LIGHT ARE INCIDENT ON A SIDE SURFACE, AND PROJECTOR INCLUDING THE SAME

CROSS-REFERENCE TO RELATED APPLICATION

This application claims priority from Japanese Patent Application No. 2010-145483, filed on Jun. 25, 2010, the entire contents of which are hereby incorporated by reference.

BACKGROUND

1. Technical Field

Embodiments described herein relate to relates to an illumination optical system, a light source device having the illumination optical system, and a projector having the light source device.

2. Related Art

Nowadays, data projectors are used frequently as image projecting devices for projecting, onto a screen, a displayed image of a personal computer, a video image, an image that is produced based on image data stored in a memory card or the like, and other images. Such projectors display a color image on a screen by condensing light emitted from a light source on a micro-mirror display device called DMD (digital micromirror device) or a liquid crystal plate.

With the spread of personal computers and video equipment such as DVD players/recorders, uses of projectors are expanding which include business presentation and home use. Whereas previously projectors mainly employed a high-luminance discharge lamp as a light source, in recent years many projectors that employ a semiconductor light-emitting device such as a laser diode as a light source have been developed or proposed. In this connection, illumination optical systems are known in which a fluorescence is excited by laser light and resulting fluorescent light emitted from the fluorescence is used as light-source light. JP-A-2003-295319 discloses a projector in which incoherent light that is emitted from a fluorescence when it is illuminated with condensed laser light is converted into parallel light by a reflector.

The present applicant proposed, in a prior patent application, a light source unit which is equipped with a blue laser diode, a fluorescence wheel in which a fluorescent light emitting region in which a green fluorescence layer is formed on a reflection surface and a diffuse transmission region in which an opening is provided with a diffuse transmission plate are arranged in the circumferential direction, and a red light-emitting diode. In this proposal, light emitted from the red light-emitting diode is used as light-source light in a red wavelength band, light emitted from the green fluorescence layer when it is illuminated with light emitted from the blue laser diode (excitation light) is used as light-source light in a green wavelength band, and light that originates from the blue laser diode and is diffuse-transmitted by the diffuse transmission plate is used as light-source light in a blue wavelength band.

In the projector disclosed in Patent document 1, the efficiency of utilization of emission light can be made high in the case where light emitted from the fluorescence when it is illuminated with excitation light emitted from a laser diode (excitation light source) is converted into parallel light by the reflector. However, this projector is associated with a problem that a projected image is prone to have unevenness in screen illuminance.

In the projector in which blue laser light is diffused by the diffusing plate is projected onto a screen, illuminance unevenness can be prevented by increasing the diffusion angle of the diffusing plate. However, the absolute value of illuminance may be reduced by loss that is caused by an increased diffusion angle. Therefore, an illumination optical system capable of capturing diffused light as efficiently as possible is necessary.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Embodiments described herein provide an illumination optical system which includes a light guide etc. and in which laser light is diffused by a diffusing member provided in the light guide and resulting diffused laser light can be captured reliably and more efficiently by the light guide, as well as a light source device and a projector which are increased in efficiency of light utilization because of the use of such an illumination optical system.

According to one or more illustrative aspects of the present invention, there is provided an illumination optical system. The system comprises: a light source device comprising: a red light-emitting device that emits red light; a blue light-emitting device that emits blue light; and a fluorescence plate comprising a green fluorescence region and a light transmission region, wherein the green fluorescence region is excited by the blue light to emit green light, and the light transmission region transmits the blue light; a light guide comprising a dichroic layer therein, wherein the dichroic layer is arranged so as to intersect a center axis of the light guide at about 45 degree to transmit the blue light while reflecting the green light and the blue light; a mirror group and a lens group, which guide the red light, the blue light and the green light to the light guide, such that the blue light transmitted through the light transmission region is incident on an end surface of the light guide, and the red light and the green light are incident on a side surface of the light guide.

According to one or more illustrative aspects of the present invention, there is provided a light source device comprising: a red light-emitting device that emits red light; a blue light-emitting device that emits blue light; and a fluorescence plate comprising a green fluorescence region and a light transmission region, wherein the green fluorescence region is excited by the blue light to emit green light, and the light transmission region transmits the blue light; a motor that rotates the fluorescence plate; and a light source controller that controls lighting of the blue light-emitting device and the red light-emitting device and rotation of the motor.

According to one or more illustrative aspects of the present invention, there is provided a projector. The projector comprises: a light source device comprising: a red light-emitting device that emits red light; a blue light-emitting device that emits blue light; and a fluorescence plate comprising a green fluorescence region and a light transmission region, wherein the green fluorescence region is excited by the blue light to emit green light, and the light transmission region transmits the blue light; a motor that rotates the fluorescence plate; and a light source controller that controls lighting of the blue light-emitting device and the red light-emitting device and rotation of the motor; a light guide comprising a dichroic layer therein, wherein the dichroic layer is arranged so as to intersect a center axis of the light guide at about 45 degree to transmit the blue light while reflecting the green light and the blue light; a mirror group and a lens group, which guide the red light, the blue light and the green light to the light guide, such that the blue light transmitted through the light transmission region is incident on an end surface of the light guide, and the red light and the green light are incident on a side surface of the light guide; a display device that generates a projection image using the red light, the blue light and the green light output from the light guide; a optical system that projects the projection image onto a screen; and a projector controller that controls the light source device, the display device, and the optical system.

Other aspects and advantages of the present invention will be apparent from the following description, the drawings and the claims.

BRIEF DESCRIPTION OF THE DRAWINGS

Exemplary embodiments of the present invention will be described in detail based on the following figures, wherein.

DETAILED DESCRIPTION OF EXEMPLARY EMBODIMENTS

Figure 1:
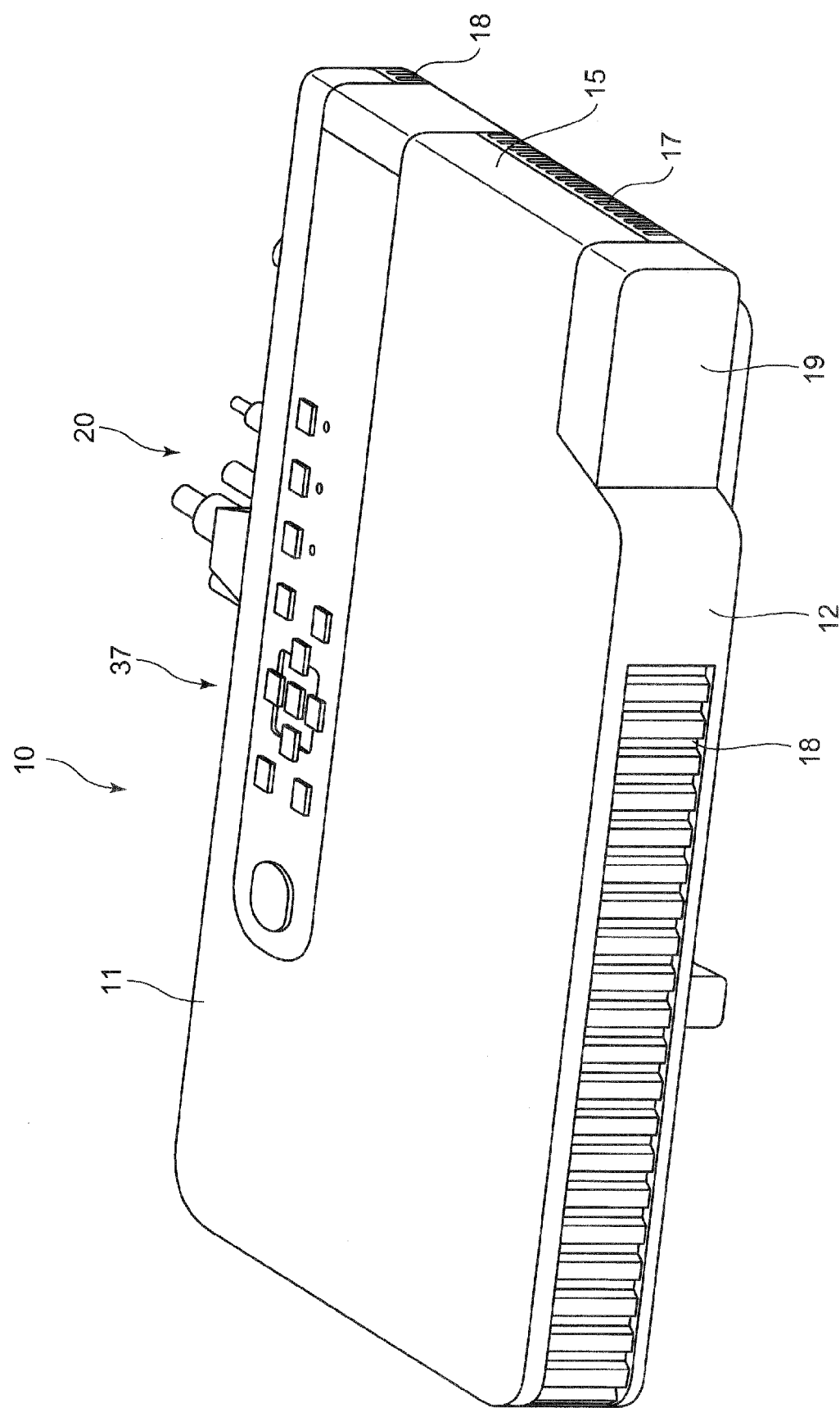
FIG. 1 is a perspective view showing an appearance of a projector according to an embodiment of the present invention.

Hereinafter, exemplary embodiments of the present invention will be now described with reference to the drawings. It should be noted that the scope of the invention is not limited to the illustrated example.

As shown in FIGS. 1-4, a projector 10 is equipped with a light source device, a display device 51 which generates a projection image using illumination light coming from the light source device, a projection-side optical system 220 which projects, onto a screen, the projection image generated by the display device 51, and a projector controller which controls the light source device, the display device 51, and the projection-side optical system 220.

The light source device is equipped with a fluorescence wheel 101 which is a fluorescence plate having a green fluorescence region and a light transmission region, a wheel motor 110 which rotates the fluorescence wheel 101, a blue light-emitting device 70, a red light-emitting device 120, and a light source control circuit 41 (light source controller) which controls the lighting of the blue light-emitting device 70 and the red light-emitting device 120 and the rotation of the wheel motor 110. The light source device is also equipped with an illumination optical system consisting of a guiding optical system 170 and a light-source-side optical system 140 which guides, to a light guide 175, by means of plural mirrors, a lens group, etc., fluorescent light generated by a green fluorescence region of the fluorescence wheel 101 when it is illuminated with light emitted from the blue light-emitting device 70, transmission light that has passed through the light transmission region of the fluorescence wheel 101, and light emitted from the red light-emitting device 120. In the fluorescence wheel 101, the green fluorescence region and the light transmission region are arranged in the circumferential direction.

The illumination optical system includes the light-source-side optical system 140 which causes light that has passed through the light transmission region of the fluorescence wheel 101 to shine on an end surface of the light guide 175 and causes light emitted from the red light-emitting device 120 and light emitted from the green fluorescence region of the fluorescence wheel 101 to shine on a side surface of the light guide 175, and the light guide 175 having a dichroic mirror 175c. The end surface, on which light that has passed through the light transmission region shines, of the light guide 175 is provided with a diffusing plate 175a (diffusing member). The dichroic mirror 175c (dichroic layer) is provided inside the light guide 175. The main body of the light guide 175 is shaped like a rectangular prism. The dichroic mirror 175c transmits blue light while reflecting green light and red light, and is disposed so as to intersect the center axis of the light guide 175 at 45°.

The light guide 175 is tapered into a truncated rectangular pyramid shape near the diffusing plate 175a, and hence the area of the diffusing plate 175a is smaller than the lateral cross section of the rectangular-prism-shaped main body of the light guide 175.

The light guide 175 may be configured such that its tapered portion is a tapered glass rod 175b or slant walls that are four flat-plate mirrors and its main body includes two glass rods 175d whose slant surfaces which intersect the center axis at 45° are in contact with each other.

The side walls of the main body of the light guide 175 may be four flat-plate mirrors. One flat-plate mirror has an opening at a position that is located on a line that intersects the center axis of the main body perpendicularly and intersects the dichroic mirror 175c at 45° at its center.

The dichroic mirror 175c may be formed on one surface of a glass prism which is disposed in a mirror tunnel whose side walls are four flat-plate mirrors.

Blue light sources 71 of the blue light-emitting device 70 are laser diodes, and the red light-emitting element 121 of the red light-emitting device 120 is a light-emitting diode.

An embodiment of the invention will be hereinafter described in detail with reference to the drawings. FIG. 1 is a perspective view showing an appearance of the projector 10. In the embodiment, the right side and the left side of the projector 10 are defined with respect to the projection direction, and its front side is defined as the screen side, that is, the light traveling destination side (the rear side is opposite to the front side).

As shown in FIG. 1, the projector 10 is generally shaped like a rectangular parallelepiped. The projector 10 has a lens cover 19 for covering a projection hole on the left of a front panel 12 which is a front side plate of a projector cabinet. Plural air inlets 18 are formed through the front panel 12. The projector 10 is equipped with an Ir receiver (not shown in FIG. 1) for receiving a control signal from a remote controller.

A top panel 11 of the cabinet is provided with a key/indicator unit 37, which includes a power switch key, a power indicator which indicates power-on or off, a projection switch key for switching between projection on and off states, an overheat indicator which indicates overheat of a light source unit, a display device, a control circuit, or the like, and other keys and indicators.

A rear panel of the cabinet is provided with an input/output connector having a D-SUB terminal, an S terminal, an RCA terminal, etc. for input of an image signal, a USB terminal, and various terminals 20 such as a power adaptor plug. Plural air inlets 18 are formed through the rear panel. Plural air outlets 17 are formed through a right-hand panel (not shown) and a left-hand panel 15 (side plate; see FIG. 1) of the cabinet. Air inlets 18 are formed through a corner portion, close to the rear panel, of the left-hand panel 15.

Figure 2:
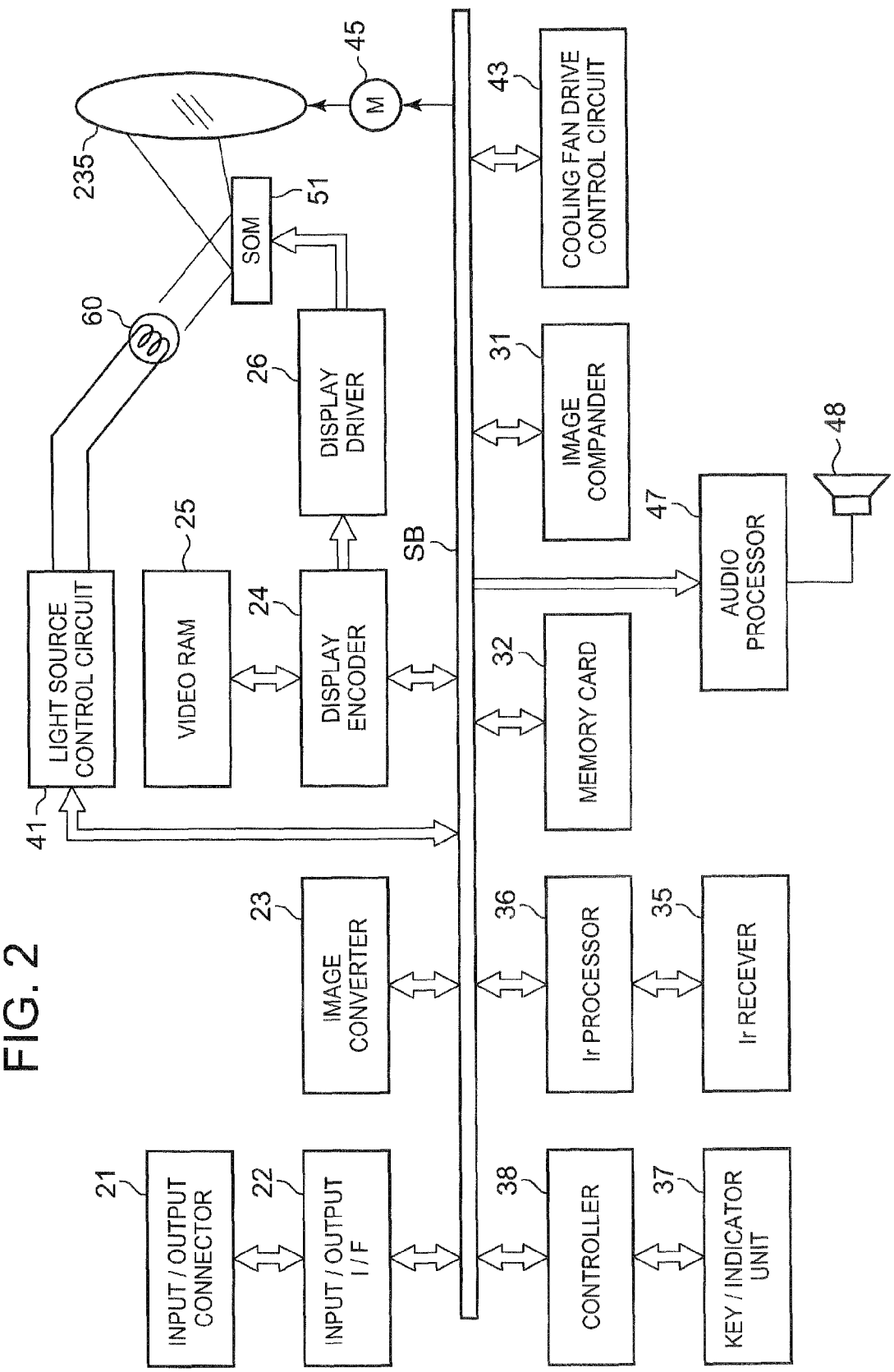
FIG. 2 is a functional block diagram of the projector according to the embodiment of the invention.

Next, the projector controller of the projector 10 will be described with reference to a block diagram of FIG. 2. The projector controller includes a controller 38, an input/output interface 22, an image converter 23, a display encoder 24, a display driver 26, etc. An image signal of any of various standards that is input from an input/output connector 21 is supplied via the input/output interface 22 and a system bus (SB) to the image converter 23, where it is converted into an image signal having a prescribed, unified format that is suitable for display. A resulting image signal is output to the display encoder 24.

The display encoder 24 develops and stores the received image signal in a video RAM 25, generates a video signal based on the information stored in the video RAM 25, and outputs the generated video signal to the display driver 26.

The display driver 26, which is functions as a display device controller, drives the display device 51 (spatial optical modulator (SOM)) at a proper frame rate according to a video signal that is output from the display encoder 24. A light beam emitted from a light source unit 60, that is, a light beam that is condensed on a prescribed surface by the light-source-side optical system 140 of the light source unit 60, is applied to the display device 51 via the guiding optical system 170, whereby an optical image is formed by reflection light of the display device 51. The optical image is projected onto a screen (not shown) via the projection-side optical system 220 (described later). A movable lens group 235 of the projection-side optical system 220 is driven by a lens motor 45 for zoom adjustment and focus adjustment.

An image compander 31 performs recording processing of compressing a luminance signal and a color difference signal of an image signal by ADCT, Huffman coding, etc. and writing resulting data to a memory card 32 (removable recording medium) sequentially. In a reproduction mode, the image compander 31 also performs processing of reading image data from the memory card 32, expanding individual image data constituting a moving image, for example, on a frame-by-frame basis, and outputting resulting image data to the display encoder 24 via the image converter 23 so that the moving image can be displayed based on the image data stored in the memory card 32.

The controller 38, which controls operations of the individual circuits of the projector 10, includes a CPU, a ROM which is stored with operation programs including various settings in a fixed manner, a RAM which is used as a work memory, and other components.

An operation signal generated by the key/indicator unit 37 which is provided on the top panel 11 of the cabinet and consists of main keys, indicators, etc. is directly sent to the controller 38. A key operation signal generated by the remote controller is received by an Ir receiver 35 and demodulated by an Ir processor 36, and a resulting code signal is output to the controller 38.

An audio processor 47 is connected to the controller 38 via the system bus (SB). Equipped with a sound source circuit such as a PCM sound source, the audio processor 47 converts audio data into an analog signal and drives a speaker 48 to cause output of an amplified sound in a projection mode and a reproduction mode.

The controller 38 controls the light source control circuit 41 (light source controller). The light source control circuit 41 individually controls the light emission of the light sources 71 of the blue light-emitting device 70 and the light emission of the light-emitting element 121 of the red light-emitting device 120 so that light-source light in a prescribed wavelength band that is required during image generation is emitted from the light source 60. The light source control circuit 41 controls the wheel motor 110 to rotationally drive the fluorescence wheel 101 of a fluorescent light emitting device.

Furthermore, the controller 38 causes a cooling fan drive control circuit 43 to detect temperatures using plural temperature sensors provided in the light source unit 60 etc. and to control the rotation speeds of plural cooling fans individually according to temperature detection results. In addition, the controller 38 causes the cooling fan drive control circuit 43 to let the cooling fans continue rotating even after power-off of the projector main body using a timer or the like or to, for example, power off the projector main body depending on the temperature detection results of the temperature sensors.

Figure 3:
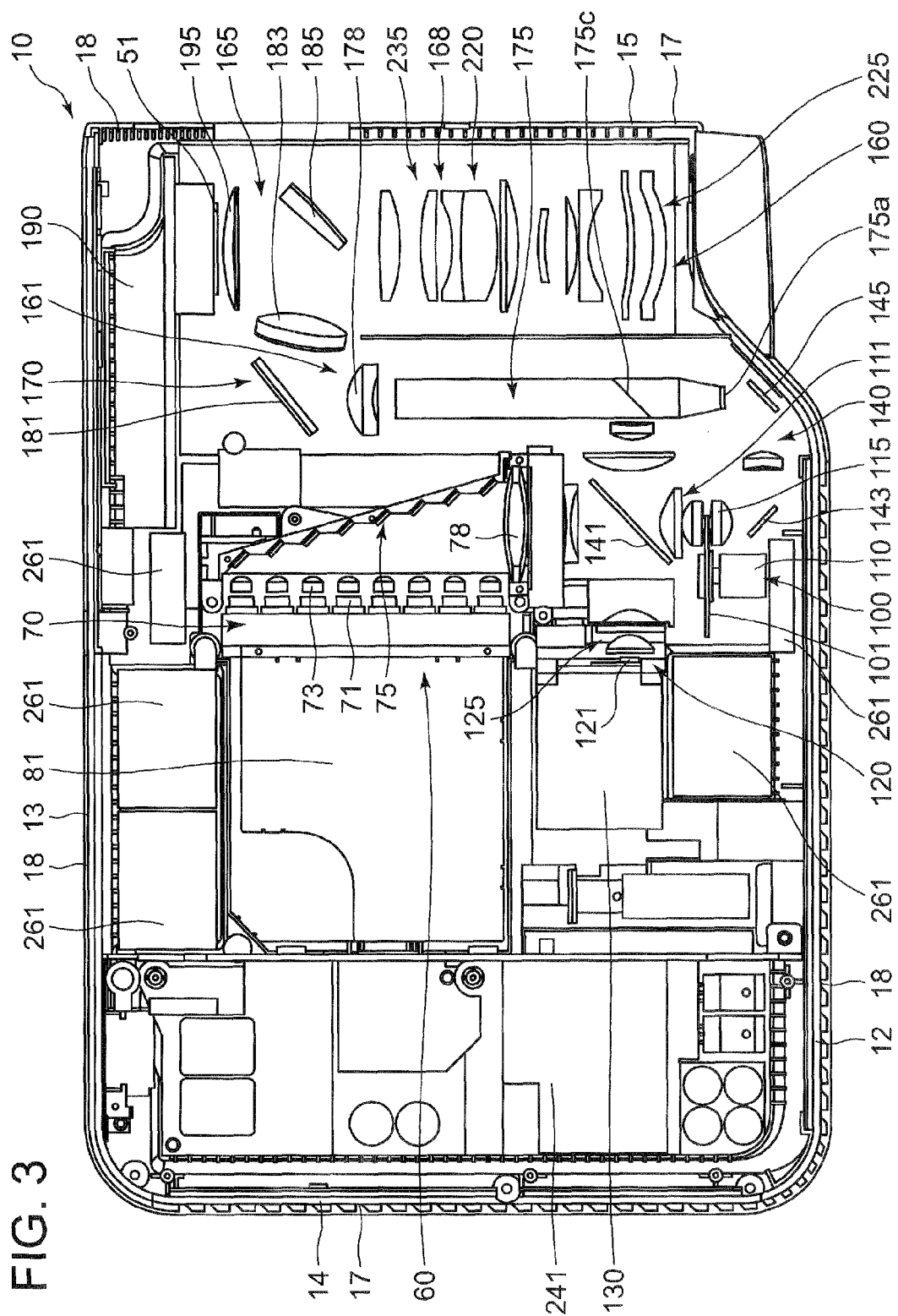
FIG. 3 is a schematic plan view showing the internal configuration of the projector according to the embodiment of the invention.

Next, the internal configuration of the projector 10 will be now described. FIG. 3 is a schematic plan view showing the internal configuration of the projector 10. As shown in FIG. 3, in the projector 10, a control circuit board 241 is disposed near the right-hand panel 14. The control circuit board 241 is mounted with a power circuit block, a light source control block, etc. The light source unit 60 is disposed beside the control circuit board 241, that is, approximately at the center of the projector cabinet. An optical system unit 160 is disposed between the light source unit 60 and the left-hand side plate 15. The illumination optical system according to the embodiment is a light source device optical system which includes the red light-emitting device 120, the blue light-emitting device 70, the fluorescence wheel 101 having the green fluorescence region and the light transmission region, and the light guide 175 having the dichroic mirror 175*c*. The illumination optical system also has mirrors and a lens group which guide, to the light guide 175, three kinds of light, that is, light emitted from the red light-emitting device 120, light that originates from the blue light-emitting device 70 and has passed through the light transmission region of the fluorescence wheel 101, and light emitted from the green fluorescence region of the fluorescence wheel 101 when it is illuminated with excitation light emitted from the blue light-emitting device 70. The illumination optical system causes light that has passed through the light transmission region of the fluorescence wheel 101 to be incident on the end surface of the light guide 175 and causes light emitted from the red light-emitting device 120 and light emitted from the green fluorescence region of the fluorescence wheel 101 to be incident on the side surface of the light guide 175. The light guide 175, which is generally shaped like a rectangular prism, has the diffusing plate 175*a* at one end and the dichroic mirror 175*c* inside. The dichroic mirror 175*c* transmits blue light while reflecting green light and red light, and is disposed so as to intersect the center axis of the light guide 175 at 45°.

The light source unit 60 is equipped with the blue light-emitting device 70 which is disposed approximately at the center of the projector cabinet in the right-left direction near the rear panel 13, a fluorescent light emitting device 100 which is disposed on the optical axis of a light beam emitted from the blue light-emitting device 70 near the front panel 12, the red light-emitting device 120 which is disposed between the blue light-emitting device 70 and the fluorescent light emitting device 100, and the light-source-side optical system 140 which applies (condenses), to (on) the side surface of the light guide 175, green fluorescent light emitted from the fluorescent light emitting device 100 and light emitted from the red light-emitting device 120 so that they share the same optical axis and applies light that originates from the blue light-emitting device 70 and has passed through the fluorescent light emitting device 100 to the end surface of the light guide 175.

The blue light-emitting device 70 is equipped with the light source group consisting of the plural blue light sources 71 which are arranged in such a manner that their optical axes are parallel with the rear panel 13, plural reflection mirrors 75 which changes, by 90°, the directions of the optical axes of light beams emitted from the respective blue light sources 71 to the directions toward the front panel 12, a condenser lens 78 which condenses light beams emitted from the blue light sources 71 and reflected by the reflection mirrors 75, respectively, a heat sink 81 which is disposed between the blue light sources 71 and the right-hand panel 14, and other components.

In the light source group, the blue light sources 71 (blue laser diodes) are arranged in matrix form. A collimator lens 73 which converts light emitted from each blue light source 71 into parallel light to enhance its directivity is disposed on the optical axis of the blue light source 71. The reflection mirrors 75 are arranged stepwise so as to reflect, toward the condenser lens 78, light beams emitted from the blue light sources 71 while decreasing their intervals and thereby reducing the horizontal cross section of a combined light beam that is output from the light source group.

Cooling fans 261 are disposed between the heat sink 81 and the rear panel 13. The blue light sources 71 are cooled by the cooling fans 261 and the heat sink 81. Another cooling fan 261 is disposed between the reflection mirrors 75 and the rear panel 13, and cools the reflection mirrors 75 and the condenser lens 78.

The fluorescent light emitting device 100 is equipped with the fluorescence wheel 101 which is disposed parallel with the front panel 12, that is, perpendicularly to the optical axis of light emitted from the blue light-emitting device 70, the wheel motor 110 which rotationally drives the fluorescence wheel 101, a condenser lens group 111 which condenses a light beam emitted from the blue light-emitting device 70 on the fluorescence wheel 101 and condenses a light beam that is emitted from the fluorescence wheel 101 toward the rear panel 13, and a condenser lens 115 which condenses a light beam that is output from the fluorescence wheel 101 toward the front panel 12.

In the fluorescence wheel 101, the green fluorescent light emitting region which emits fluorescent light in a green wavelength band when illuminated with excitation light emitted from the blue light-emitting device 70 and the light transmission region which transmits light emitted from the blue light-emitting device 70 are arranged in the circumferential direction. A base member used in the green fluorescent light emitting region is made of a metal such as copper or aluminum, and the rear-panel-13-side surface of the base member is mirror-coated by silver evaporation or the like. A green fluorescence layer is formed on the mirror-coated surface.

Light emitted from the blue light-emitting device 70 and shining on the green fluorescence layer of the fluorescence wheel 101 excites the green fluorescence of the green fluorescence layer. Fluorescent light emitted from the green fluorescence to all directions enters the condenser lens group 111 after traveling toward the rear panel 13 directly or being reflected by the surface of the fluorescence wheel 101 and output to toward the rear panel 13. Light emitted from the blue light-emitting device 70 and shining on the light transmission region of the fluorescence wheel 101 enters the condenser lens 115 as transmission light. A cooling fan 261 is disposed between the wheel motor 110 and the front panel 12, and cools the fluorescent light emitting device 100 etc.

The red light-emitting device 120 is a monochrome light-emitting device which is equipped with the red light-emitting element 121 disposed in such a manner that its optical axis is perpendicular to the optical axis of the blue light-emitting device 70 and a condenser lens group 125 which condenses light emitted from the red light-emitting element 121. The red light-emitting element 121 is a red light-emitting diode. The red light-emitting device 120 is disposed in such a manner that its optical axis crosses the optical axes of light emitted from the blue light-emitting device 70 and green-wavelength-band light emitted from the fluorescence wheel 101. The red light-emitting device 120 is equipped with a heat sink 130 which is disposed on the right-hand panel 14 side of the red light-emitting element 121. A cooling fan 261 is disposed between the heat sink 130 and the front panel 12, and cools the red light-emitting element 121.

The light-source-side optical system 140 includes condenser lenses which condense light beams in red, green, and blue wavelength bands and reflection mirrors and a dichroic mirror which change the directions of the optical axes of light beams in the red, green, and blue wavelength bands to, for example, equalize part of those optical axes, and other components. More specifically, a first dichroic mirror 141 is disposed at a position where blue-wavelength-band light emitted from the blue light-emitting device 70, green-wavelength-band light emitted from the fluorescence wheel 101, and red-wavelength-band light emitted from the red light-emitting device 120 cross each other. The first dichroic mirror 141 transmits the blue-wavelength-band light and the red-wavelength-band light, and reflects the green-wavelength-band light to change the direction of its optical axis by 90° toward the left-hand panel 15.

The first dichroic mirror 141 can thus equalize the optical axes of red-wavelength-band light and green-wavelength-band light, and input them to the light guide 175 through its side surface while they are condensed by lenses.

A first reflection mirror 143 is disposed on the optical axis of blue laser light that has passed through the fluorescence wheel 101, that is, between the condenser lens 115 and the front panel 12. The first reflection mirror 143 changes the direction of the optical axis of the blue laser light by 90° toward the left-hand panel 15 by reflecting it. A second reflection mirror 145 is disposed near the optical system unit 160 on the optical axis of blue laser light reflected by the first reflection mirror 143. The second reflection mirror 145 changes the direction of the optical axis of the blue laser light by 90° toward the rear panel 13. Blue laser light reflected by the second reflection mirror 145 shines on the diffusing plate 175a which serves as an incidence surface of the light guide 175. Since blue laser light that has passed through the fluorescence wheel 101 enters the condenser lens 115 without being diffused, the condenser lens 115, the first reflection mirror 143, and the second reflection mirror 145 can be made smaller in area and more compact than in the conventional case in which blue laser light is diffuse-transmitted by a fluorescence wheel.

The dichroic mirror 175c is disposed inside the light guide 175 at a position where the optical axes of red-wavelength-band light that has passed through the first dichroic mirror 141, green-wavelength-band light reflected by the first dichroic mirror 141, and blue laser light reflected by the second reflection mirror 145 cross each other. The dichroic mirror 175c transmits the blue-wavelength-band light, and reflects the red-wavelength-band light and the green-wavelength-band light to change the directions of their optical axes by 90° toward the rear panel 13. The condenser lenses are disposed between the above dichroic mirrors and the reflection mirrors.

The light source unit 160, which is generally shaped like a bracket, includes three blocks, that is, an illumination-side block 161 which is located on the left side of the blue light-emitting device 70, an image forming block 165 which is located near the position where the rear panel 13 and left-hand panel 15 intersect each other, and a projection-side block 168 which is located between the light-source-side optical system 140 and the left-hand panel 15.

The illumination-side block 161 has part of the guiding optical system 170 which guides, to the display device 51 of the image forming block 165, light-source light emitted from the light source unit 60. The part of the guiding optical system 170 which belongs to the illumination-side block 161 includes the light guide 175 which converts a light beam emitted from the light source unit 60 into a light beam having a uniform intensity profile, an optical axis conversion mirror 181 which changes the direction of the optical axis of a light beam emitted from the light guide 175 toward the image forming block 165, and other components.

The image forming block 165 includes the other part of the guiding optical system 170, that is, a condenser lens 183 which condenses light-source light reflected by the optical axis conversion mirror 181 on the display device 51 and an illumination mirror 185 which causes a light beam that has passed through the condenser lens 183 to shine on the display device 51 at a prescribed angle. The image forming block 165 also has the display device 51 which is a DMD. A heat sink 190 is disposed between the display device 51 and the rear panel 13, and cools the display device 51. A condenser lens 195, which is a component of the projection-side optical system 220, is disposed in front of the display device 51 in its vicinity.

The projection-side block 168 has a lens group of the projection-side optical system 220 which project light reflected by the display device 51. The lens group of the projection-side optical system 220 includes a fixed lens group 225 which is housed in a fixed lens barrel and the movable lens group 235 which is housed in a movable lens barrel, and thereby serves as a variable focal length lens having a zoom function. Zoom adjustment and focus adjustment are enabled by moving the movable lens group 235 by the lens motor 45.

In the projector 10 having the above configuration, the blue light-emitting device 70 and the red light-emitting device 120 are caused to emit light beams at different time points while the fluorescence wheel 101 is rotated. As a result, red-wavelength-band light, green-wavelength-band light, and blue-wavelength-band light are provided to the light guide 175 via the light-source-side optical system 140 and shine on the display device 51 via the guiding optical system 170 sequentially. The display device 51 (DMD) displays images of the respective colors in a time-divisional manner according to data, whereby color image is generated on a screen.

Figure 4:
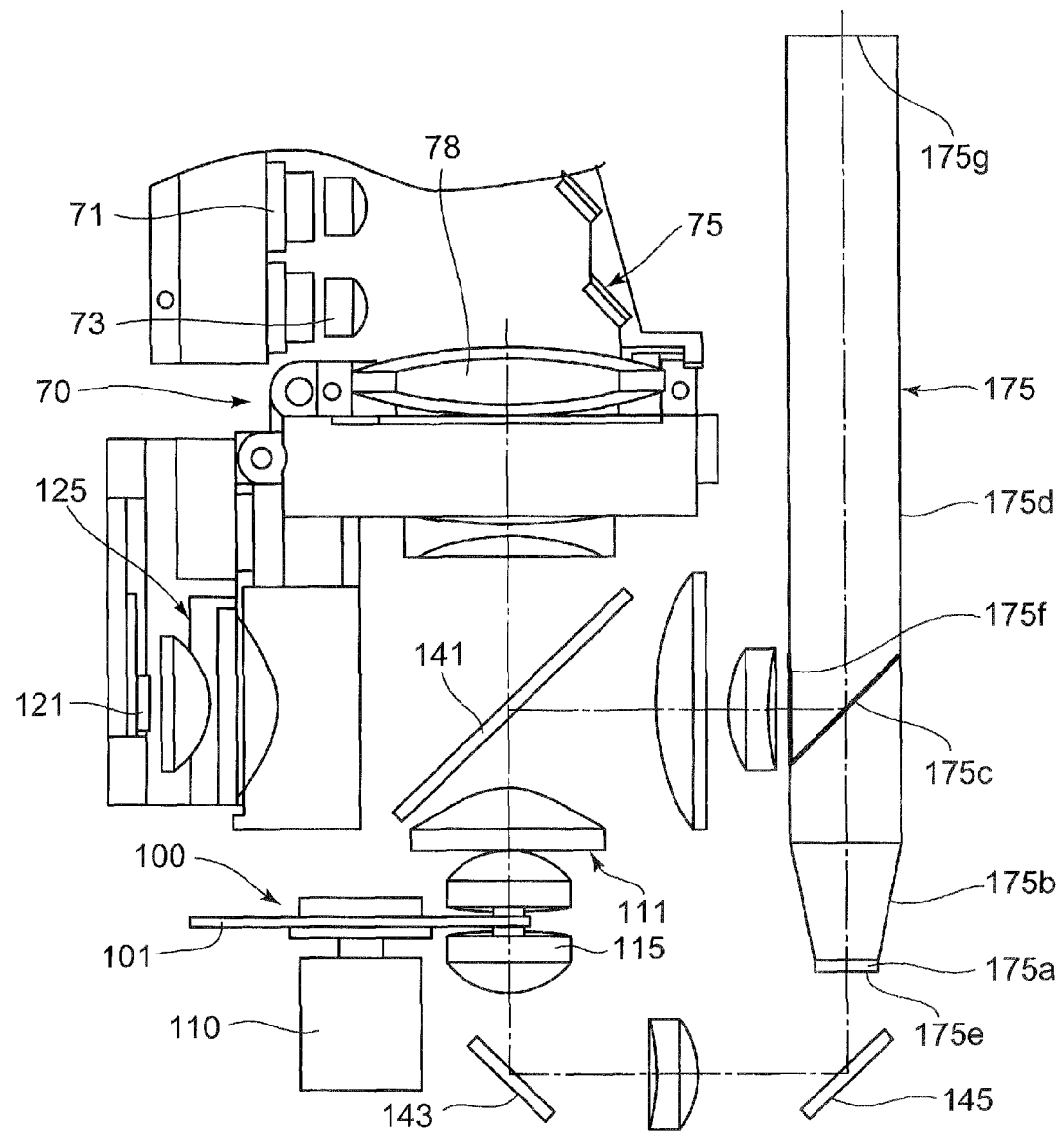
FIG. 4 shows an illumination optical system according to the embodiment of the invention.

The illumination optical system will be described in detail below with reference to FIG. 4. The main body of the light guide 175 of the illumination optical system is formed by two glass rods 175d. The light guide 175 has an incidence surface 175e at one end and an exit surface 175g at the other end, and also has a side incidence portion 175f. A diffusing plate 175a is placed at the end, to serve as the incidence surface 175e, of the light guide plate 175. Blue-wavelength-band light is diffused by the diffusing plate 175 and output from the exit surface 175g. Red-wavelength-band light and green-wavelength-band light are input through the side incidence portion 175f, reflected by the dichroic mirror 175c which is provided inside the light guide 175, and output from the exit surface 175g.

Since blue laser light that has passed through the light transmission region of the fluorescence wheel 101 is not diffused until shining on the diffusing plate 175a of the light guide 175, the area of the incidence surface 175e of the light guide 175 can be made small. The portion, adjacent to the incidence surface 175e, of the light guide 175 is a tapered portion which is shaped like a truncated triangular pyramid, that is, a tapered glass rod 175b. The portion, including the side incidence portion 175f, is a main body which is shaped like a rectangular prism. The tapered portion may be formed by slant walls that are four flat-plate mirrors instead of the tapered glass rod 175b.

Since blue laser light is not diffused until shining on the diffusing plate 175a of the light guide 175, the areas of the first reflection mirror 143 and the second reflection mirror 145 on which the blue laser light shines after passing through the light transmission region of the fluorescence wheel 101 can be made small.

The dichroic mirror 175c which is provided inside the light guide 175 is formed by coating one of the slant bonding surfaces of the two glass rods 175d which are bonded together. As such, the light guide 175 is formed by the tapered glass rod 175b which is provided with the diffusing plate 175a and the two glass rods 175d between which the dichroic mirror 175c is formed.

As described above, since the diffusing plate 175a serves as the incidence surface 175e of the light guide 175, it is not necessary to condense blue laser light around the light transmission region of the fluorescence wheel 101. Therefore, all blue light that has passed through the fluorescence wheel 101 is input to the light guide 175, and hence the efficiency of utilization of blue-wavelength-band light can be increased. The light guide 175 has the tapered glass rod 175b adjacent to the incidence surface 175e to narrow the diffusion angle of diffused blue-wavelength-band light, which also contributes to the increase of the efficiency of light utilization. Furthermore, since the optical path length of blue-wavelength-band light in the light guide 175 is longer than that of red-wavelength-band light and green-wavelength-band light, the unevenness in screen illuminance can be suppressed.

The main body of the light guide 175 includes the two glass rods 175d each of which is shaped like a rectangular prism, and green light and red light are applied to the side surface of the one glass rod 175d so as to shine on the dichroic mirror 175c. Each of the green light and the red light is reflected by the dichroic mirror 175c, travels through the one glass rod 175d while being reflected totally, and is output from the exit surface 175g.

Figure 5A:
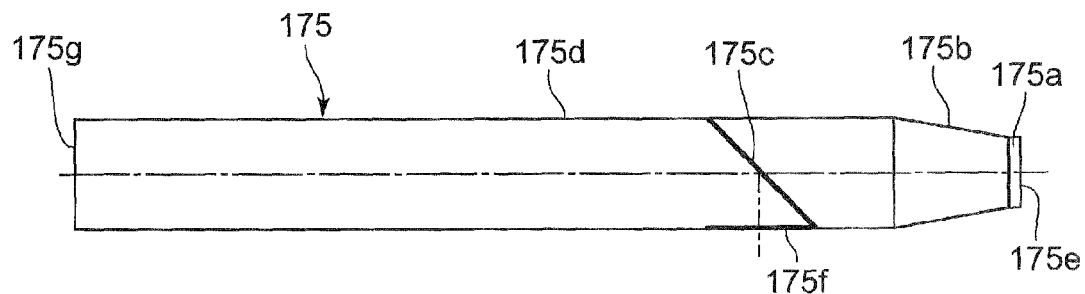
FIGS. 5A-5D show modified light guides according to the present embodiment.
Figure 5B:
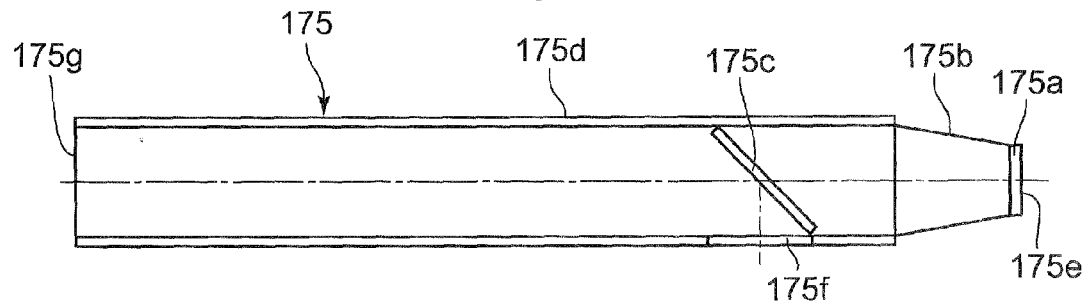
Figure 5C:
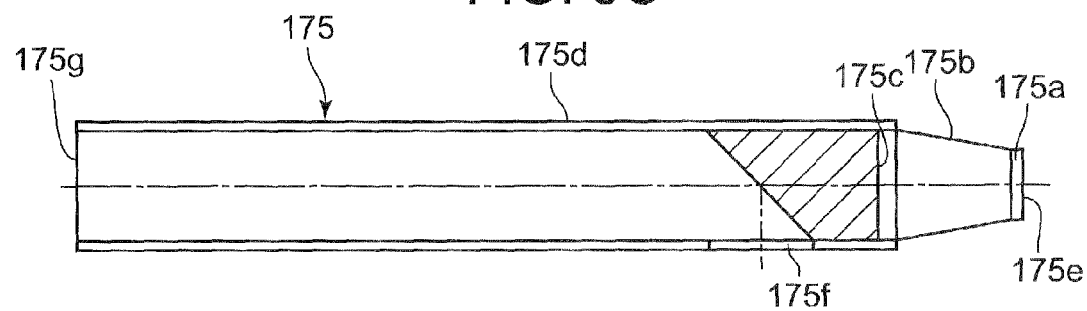
Figure 5D:
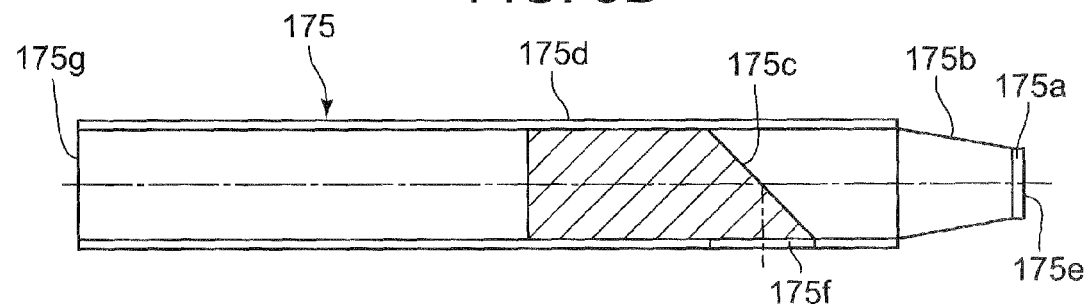

Next, modifications of the light guide 175 in which a light tunnel 175d is used instead of the glass rods 175d will be described with reference to FIGS. 5A-5D. FIG. 5A is a sectional view of the light guide 175 according to the above embodiment which uses the glass rods 175d. FIGS. 5B-5D are sectional views of light guides 175 each using a light tunnel 175h.

As shown in FIGS. 5B-5D, the glass rods 175d (main body) of the light guide 175 (see FIG. 5A) can be replaced by a light tunnel 175h which includes four flat-plate mirrors (side walls). In this case, the light guide 175 includes the tapered glass rod 175b, the dichroic mirror 175c, and the light tunnel 175h. In the modification of FIG. 5B, an incidence portion 175f is formed by forming an opening through the flat-plate mirror at the position that is located on the line that intersects the center line of the main body of the light guide 175 perpendicularly (intersects the dichroic mirror 175c at 45°) at the center of the dichroic mirror 175c. Each of green light and red light is applied to the opening of the light tunnel 175h, enters the light tunnel 175h, and shines on the dichroic mirror 175c. After being reflected by the dichroic mirror 175c, each of the green light and the red light travels through the light tunnel 175h while being reflected by the flat-plate mirrors and is output from the exit hole 175g.

As shown in FIGS. 5C and 5D, the light tunnel 175h of the light guide 175 may incorporate a glass prism obtained by obliquely cutting an end portion of a rectangular-prism-shaped glass member so as to produce a slant surface. The slant surface is coated to form the dichroic mirror 175c. In this case, the light guide 175 includes the tapered glass rod 175b, the dichroic mirror 175c formed on the glass prism, and the light tunnel 175h. An incidence portion 175f is formed by forming an opening through the flat-plate mirror at the position that is located on the line that intersects the center line of the main body of the light guide 175 perpendicularly (intersects the dichroic mirror 175c at 45°) at the center of the dichroic mirror 175c. Each of green light and red light is applied to the opening of the plate-like mirror and shines on the dichroic mirror 175c. After being reflected by the dichroic mirror 175c, each of the green light and the red light travels through the light tunnel 175h while being reflected by the flat-plate mirrors and is output from the exit hole 175g. The glass prism may be disposed either on the diffusing plate 175a side (see FIG. 5C) or on the exit hole 175g side (see FIG. 5D) in the light guide 175.

In the light guides 175 shown in FIGS. 5A-5D, the tapered portion is the glass rod. Alternatively, the tapered portion may be a hollow, truncated rectangular pyramid structure formed by connecting the oblique sides of four mirrors which are trapezoidal flat plates.

Whichever of the glass rods 175d and the light tunnel 175h is used to form the light guide 175, since blue laser light is diffused by the diffusing plate 175a which serves as the incidence surface 175e of the light guide 175 and the diffusion angle of resulting diffused blue laser light is narrowed by the tapered glass rod 175b, whereby the efficiency of user of blue-wavelength-band light can be increased and the illuminance unevenness can be suppressed.

As described above, according to the invention, light beams emitted from the light-emitting devices and the fluorescence can efficiently be guided to the light guide 175 by the mirrors and the lens groups. And the efficiency of light utilization can be increased by the illumination optical system in which laser light is diffused by the diffusing plate 175a (diffusing member) provided in the light guide 175 and resulting diffused laser light can be captured reliably and more efficiently by the light guide 175.

In the illumination optical system according to the invention, the blue light-emitting device 70 has laser diodes and the red light-emitting device 120 has a light-emitting diode. Light that has passed through the light transmission region of the fluorescence wheel 101 is caused to shine on the diffusing plate 175a of the light guide 175 along the center axis of the light guide 175. Light emitted from the red light-emitting device 120 and light emitted from the green fluorescence region are caused to shine on the side surface of the light guide 175 along the common optical axis and then shine on the dichroic mirror 175c. The efficiency of utilization of blue-wavelength-band light can thus be increased.

In the illumination optical system according to the invention, the portion, adjacent to the diffusing plate 175a, of the light guide 175 is the tapered portion having a truncated rectangular pyramid shape, whereby the area of the diffusing plate 175a is smaller than the lateral cross section of the rectangular-prism-shaped main body of the light guide 175. As a result, the optical path length of blue-wavelength-band light can be made long and hence the illuminance unevenness can be suppressed.

In the illumination optical system according to the invention, the main body of the light guide 175 is the two glass rods whose slant surfaces which intersect the center axis of the light guide 175 at 45° are in contact with each other. A dichroic mirror surface can be formed on one of the slant surfaces by coating it. No dedicated dichroic mirror is necessary and hence the number of components can be reduced.

In the illumination optical system according to the invention, the main body of the light guide 175 may be the light tunnel 175h which includes four flat-plate mirrors (side walls). This contributes to reduction in the cost of components and weight reduction.

In the illumination optical system according to the invention, the fluorescence wheel 101 has the green fluorescence region and the light transmission region which are arranged in the circumferential direction. Light emitted from the blue light-emitting device 70 (laser diodes) is caused to pass through the light transmission region of the fluorescence wheel 101, and resulting high-directivity laser light is applied to the diffusing plate 175a which serves as the incidence surface 175e of the light guide 175. Therefore, blue-wavelength-band light can be captured reliably and more efficiently.

The light source device according to the invention can increase the efficiency of light utilization because it is equipped with the illumination optical system in which laser light is diffused by the diffusing plate 175a provided in the light guide 175 and resulting diffused laser light can be captured more efficiently.

The projector 10 according to the invention can increase the efficiency of light utilization because it is equipped with the light source device in which laser light is diffused by the diffusing plate 175a provided in the light guide 175 and resulting diffused laser light can be captured reliably and more efficiently.

The invention is not limited to the above embodiment, and various modifications and improvements can be made freely without departing the spirit and scope of the invention. For example, the invention can also be applied to the following projector. Only excitation light emitted from the blue light-emitting device 70 is used as a light-source light. In the fluorescence wheel 101, a green fluorescent light emitting region which emits fluorescent light in a green wavelength band when receiving, as excitation light, light emitted from the blue light-emitting device 70, a light transmission region which transmits the light emitted from the blue light-emitting device 70, and a red fluorescent light emitting region which emits fluorescent light in a red wavelength band when receiving, as excitation light, the light emitted from the blue light-emitting device 70 are arranged in the circumferential direction. Red-wavelength-band light, green-wavelength-band light, and blue-wavelength-band light are thus generated using light emitted from the blue light-emitting device 70.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An illumination optical system comprising:
a light source device comprising:
a red light-emitting device that emits red light;
a blue light-emitting device that emits blue light; and
a fluorescence plate comprising a green fluorescence region and a light transmission region, wherein the green fluorescence region is excited by the blue light to emit green light, and the light transmission region transmits the blue light;
a light guide comprising a dichroic layer therein, wherein the dichroic layer is arranged so as to intersect a center axis of the light guide at about 45 degrees to transmit the blue light while reflecting the green light and the red light; and
a mirror group and a lens group, which guide the red light, the blue light and the green light to the light guide, such that the blue light transmitted through the light transmission region is incident on an end surface of the light guide, and the red light and the green light are incident on a side surface of the light guide,
wherein the blue light-emitting device is a blue laser diode,
wherein the red-light emitting device is a red light-emitting diode,
wherein a diffusing member is provided on the end surface of the light guide,
wherein the blue light transmitted by the light transmission region is incident on the diffusing member, travels in the light guide along the center axis of the light guide, and then is transmitted by the dichroic layer, and
wherein the red light and the green light are incident on the side surface of the light guide such that an optical axis of the red light corresponds to an optical axis of the green light, and then are reflected by the dichroic layer.

2. The illumination optical system according to claim 1, wherein the light guide has:
a main body formed in rectangular-prism shape; and
a tapered portion formed in a truncated rectangular pyramid shape, the tapered portion being adjacent to the diffusing member,
wherein a cross-section area of the diffusing member is smaller than a cross-section area of the main body when viewed from the end surface of the light guide.

3. The illumination optical system according to claim 2, wherein the tapered portion comprises a first glass rod, and
wherein the main body comprises a second glass rod and a third glass rod, and respective slant surfaces of the second and third glass rods intersect the center axis at about 45 degree and are in contact with each other.

4. The illumination optical system according to claim 2, wherein the tapered portion comprises four flat-plate mirrors, and the four flat-plate mirrors serve as slant side walls of the tapered portion, and
wherein the main body comprises two glass rods, and respective slant surfaces of the glass rods intersect the center axis at about 45 degrees and are in contact with each other.

5. The illumination optical system according to claim 2, wherein the tapered portion comprises a glass rod,
wherein side walls of the main body comprise four flat-plate mirrors, and
wherein an opening is formed through one of the flat-plate mirrors at a position that is located on a line that is orthogonal to a center line of the main body and intersects the dichroic mirror at about 45 degrees at a center of the dichroic mirror.

6. The illumination optical system according to claim 2, wherein the tapered portion comprises a first group of four flat-plate mirrors,
wherein the first group of four flat-plate mirrors serve as slant side walls of the tapered portion,
wherein side walls of the main body comprise a second group of four flat-plate mirrors, and
wherein an opening is formed through one of the flat-plate mirror of the second group of four flat-plate mirrors at a position that is located on a line that is orthogonal to a center line of the main body and intersects the dichroic mirror at about 45 degrees at a center of the dichroic mirror.

7. The illumination optical system according to claim 4, wherein the four flat-plate mirrors form a mirror tunnel, and a glass prism is provided in the mirror tunnel, and wherein the dichroic layer is formed on a slant surface of the glass prism.

8. A projector comprising:
a light source device comprising:
a red light-emitting device that emits red light;
a blue light-emitting device that emits blue light,
a fluorescence plate comprising a green fluorescence region and a light transmission region, wherein the green fluorescence region is excited by the blue light to emit green light, and the light transmission region transmits the blue light;
a motor that rotates the fluorescence plate; and
a light source controller that controls lighting of the blue light-emitting device and the red light-emitting device and rotation of the motor;
a light guide comprising a dichroic layer therein, wherein the dichroic layer is arranged so as to intersect a center axis of the light guide at about 45 degrees to transmit the blue light while reflecting the green light and the blue light;
a mirror group and a lens group, which guide the red light, the blue light and the green light to the light guide, such that the blue light transmitted through the light transmission region is incident on an end surface of the light guide, and the red light and the green light are incident on a side surface of the light guide;
a display device that generates a projection image using the red light, the blue light and the green light output from the light guide;
an optical system that projects the projection image onto a screen; and
a projector controller that controls the light source device, the display device, and the optical system,
wherein the blue light-emitting device is a blue laser diode,
wherein the red-light emitting device is a red light-emitting diode,
wherein a diffusing member is provided on the end surface of the light guide,
wherein the blue light transmitted by the light transmission region is incident on the diffusing member, travels in the light guide along the center axis of the light guide, and then is transmitted by the dichroic layer, and
wherein the red light and the green light are incident on the side surface of the light guide such that an optical axis of the red light corresponds to an optical axis of the green light, and then are reflected by the dichroic layer.

* * * * *